United States Patent
Sperry, III

(10) Patent No.: US 12,325,961 B2
(45) Date of Patent: Jun. 10, 2025

(54) METHOD FOR MAKING AIR PURIFYING PAPER GOODS

(71) Applicant: Leonard Tim Sperry, III, Boca Raton, FL (US)

(72) Inventor: Leonard Tim Sperry, III, Boca Raton, FL (US)

(*) Notice: Subject to any disclaimer, the term of this patent is extended or adjusted under 35 U.S.C. 154(b) by 210 days.

(21) Appl. No.: 17/472,195

(22) Filed: Sep. 10, 2021

(65) Prior Publication Data

US 2022/0074145 A1 Mar. 10, 2022

Related U.S. Application Data

(60) Provisional application No. 63/076,543, filed on Sep. 10, 2020.

(51) Int. Cl.
| | | |
|---|---|---|
| *D21H 27/08* | (2006.01) | |
| *B01D 53/02* | (2006.01) | |
| *B01J 20/18* | (2006.01) | |
| *B01J 20/24* | (2006.01) | |
| *B01J 20/28* | (2006.01) | |
| *B01J 20/30* | (2006.01) | |
| *D21H 17/68* | (2006.01) | |
| *D21H 21/22* | (2006.01) | |

(52) U.S. Cl.
CPC .............. *D21H 27/08* (2013.01); *B01D 53/02* (2013.01); *B01J 20/18* (2013.01); *B01J 20/24* (2013.01); *B01J 20/28038* (2013.01); *B01J 20/3085* (2013.01); *D21H 17/68* (2013.01); *D21H 21/22* (2013.01); *B01D 2253/108* (2013.01); *B01D 2257/504* (2013.01); *B01D 2257/7022* (2013.01); *B01D 2257/708* (2013.01)

(58) Field of Classification Search
CPC ........ D21H 27/08; D21H 17/68; D21H 21/22; B01D 53/02; B01D 2253/108; B01D 2257/504; B01D 2257/7022; B01D 2257/708; B01J 20/18; B01J 20/24; B01J 20/28038; B01J 20/3085
USPC ........................................................ 502/404
See application file for complete search history.

(56) References Cited

U.S. PATENT DOCUMENTS

| | | |
|---|---|---|
| 3,271,177 A | 9/1966 | Rumberger |
| 4,293,458 A | 10/1981 | Henkel et al. |
| 4,337,276 A | 6/1982 | Nakamura et al. |
| 4,622,229 A | 11/1986 | Toshitsugu |
| 4,636,392 A | 1/1987 | Toshitsugu |
| 4,759,935 A | 7/1988 | Toshitsugu |
| 4,939,030 A | 7/1990 | Shoichi et al. |
| 5,030,510 A | 7/1991 | Yokoyama et al. |
| 5,230,959 A | 7/1993 | Young et al. |
| 5,330,844 A | 7/1994 | Iwata et al. |
| 5,432,000 A | 7/1995 | Young et al. |
| 5,498,478 A | 3/1996 | Young et al. |
| 5,516,585 A | 5/1996 | Young et al. |
| 5,603,997 A | 2/1997 | Anna et al. |
| 5,744,205 A | 4/1998 | Kawai et al. |
| 5,827,577 A | 10/1998 | Spencer |
| 6,270,893 B1 | 8/2001 | Young et al. |
| 7,927,415 B2 | 4/2011 | Chen et al. |
| 8,172,979 B2 | 5/2012 | Kim |
| 9,489,872 B2 | 11/2016 | Yoshihto et al. |
| 9,777,196 B2 | 10/2017 | Thibault et al. |
| 9,783,931 B2 | 10/2017 | O'Neill al. |
| 10,026,341 B2 | 7/2018 | Yoshihto et al. |
| 10,994,508 B2 | 5/2021 | Zeyfert et al. |
| 2002/0114958 A1 | 8/2002 | Endo et al. |
| 2002/0134239 A1 | 9/2002 | Tang et al. |
| 2002/0192131 A1 | 12/2002 | Dussaud et al. |
| 2003/0091767 A1 | 5/2003 | Podhajny |
| 2004/0210099 A1 | 10/2004 | Shiratori |
| 2005/0037162 A1 | 2/2005 | Adams |
| 2005/0085577 A1 | 4/2005 | Ching et al. |
| 2005/0129952 A1 | 6/2005 | Sawada et al. |
| 2006/0014037 A1 | 1/2006 | Dussaud et al. |
| 2006/0159913 A1 | 7/2006 | Toru et al. |
| 2008/0268224 A1 | 10/2008 | Kim |
| 2009/0022978 A1 | 1/2009 | Wuu |
| 2010/0032092 A1 | 2/2010 | Chen et al. |
| 2010/0068474 A1 | 3/2010 | Sauer et al. |
| 2010/0236969 A1 | 9/2010 | Auras et al. |

(Continued)

FOREIGN PATENT DOCUMENTS

| | | |
|---|---|---|
| AT | 373313 B | 1/1984 |
| AU | 574179 A | 6/1988 |

(Continued)

*Primary Examiner* — Edward M Johnson

(57) ABSTRACT

Disclosed herein is a method for integrating an air purification compound during the production of paper goods. The air purification compound is preferably a zeolite compound used to extract VOCs from an environment. The method begins by processing the wood chips into a raw pulp slurry with a pulping system. The method continues by separating organic fibers from lignin compounds in the raw pulp slurry with a processing system. The method continues by mixing the air-purification compound into the organic fibers to form a paperboard pulp mix with a mixing system. The mixing system is capable of incorporating the air purification compound into the organic fibers at any point during any secondary processing operation required to transition the organic fibers into the paperboard pulp mix. The method continues by manufacturing at least one paper good from the paperboard pulp mix with a manufacturing system.

4 Claims, 5 Drawing Sheets

(56) References Cited

U.S. PATENT DOCUMENTS

| | | |
|---|---|---|
| 2011/0048261 A1 | 3/2011 | Shimura |
| 2013/0167840 A1 | 7/2013 | Sikorski et al. |
| 2014/0331604 A1 | 11/2014 | Kuehl et al. |
| 2015/0156994 A1 | 6/2015 | Yuyama |
| 2017/0065927 A1 | 3/2017 | Sauer et al. |
| 2017/0275076 A1 | 9/2017 | Edgington et al. |
| 2018/0080174 A1 | 3/2018 | O'Neill et al. |
| 2018/0105663 A1 | 4/2018 | Zeyfert et al. |
| 2019/0291938 A1 | 9/2019 | Backfolk et al. |
| 2020/0063365 A1* | 2/2020 | Parker .................. D21H 27/005 |
| 2020/0317413 A1 | 10/2020 | Fortin |
| 2020/0361681 A1 | 11/2020 | Zeyfert et al. |
| 2021/0040296 A1 | 2/2021 | Yonemoto et al. |
| 2021/0221694 A1 | 7/2021 | Sperry, III |
| 2022/0016875 A1 | 1/2022 | Fortin et al. |

FOREIGN PATENT DOCUMENTS

| | | |
|---|---|---|
| AU | 659226 A1 | 5/1995 |
| AU | 2008276072 AA | 1/2009 |
| AU | 2011100570 AD | 5/2011 |
| AU | 2016026444 A | 12/2016 |
| AU | 2016269444 B | 12/2016 |
| BR | PI081555 A | 7/2008 |
| BR | PI0713118 A2 | 4/2012 |
| BR | 112013016421 A2 | 10/2016 |
| BR | 112019000105 B1 | 7/2017 |
| BR | 112017014715 A2 | 2/2018 |
| BR | 112017023915 A1 | 7/2018 |
| BR | 112014002480 B1 | 4/2021 |
| CA | 1100355 A | 5/1981 |
| CA | 1251990 A | 4/1989 |
| CA | 1316805 A1 | 4/1993 |
| CA | 2081081 C | 7/1997 |
| CA | 2272542 A | 5/1998 |
| CA | 2540240 A | 3/2006 |
| CA | 2693848 AA | 1/2009 |
| CA | 2824613 A | 12/2011 |
| CA | 2824613 C | 12/2011 |
| CA | 2982417 A | 10/2017 |
| CA | 3027321 A | 12/2018 |
| CA | 3096376 A | 10/2020 |
| CA | 2843824 C | 1/2022 |
| CN | 1238715 A | 12/1999 |
| CN | 12222347 C | 10/2005 |
| CN | 1810905 A | 8/2006 |
| CN | 1835841 A | 9/2006 |
| CN | 101294050 A | 12/2007 |
| CN | 100417700 C | 9/2008 |
| CN | 101528341 A | 9/2009 |
| CN | 101801662 A | 8/2010 |
| CN | 101945905 A | 1/2011 |
| CN | 10331440 A | 12/2011 |
| CN | 103314400 B | 12/2011 |
| CN | 106183489 A | 12/2011 |
| CN | 106237785 A | 12/2011 |
| CN | 104349668 A | 2/2015 |
| CN | 109415152 A | 7/2017 |
| CN | 107074429 A | 8/2017 |
| CN | 107667060 A | 2/2018 |
| CN | 109056410 A | 12/2018 |
| CN | 109695179 A | 4/2019 |
| CN | 107074429 B | 8/2019 |
| CN | 111918932 A | 11/2020 |
| CN | 109415152 B | 5/2021 |
| CN | 112962346 A | 6/2021 |
| DE | 60100885 TA | 8/2004 |
| DE | 102006029849 A1 | 1/2008 |
| DK | 0540075 T3 | 4/1995 |
| DK | 1250042 T3 | 1/2004 |
| EP | 0014347 A1 | 8/1980 |
| EP | S5598999 A1 | 8/1980 |
| EP | 0163474 A | 12/1985 |
| EP | 0307229 A1 | 3/1989 |
| EP | 0338838 A1 | 10/1989 |
| EP | 0356161 A2 | 2/1990 |
| EP | 0492521 A | 7/1992 |
| EP | 0540075 A1 | 5/1993 |
| EP | 0939674 A1 | 9/1999 |
| EP | 1210972 A | 6/2002 |
| EP | 1374688 A1 | 1/2004 |
| EP | 1525802 A1 | 4/2005 |
| EP | 1674543 A | 6/2006 |
| EP | 1985678 A | 10/2008 |
| EP | 134105 B1 | 3/2010 |
| EP | 2054150 B1 | 9/2010 |
| EP | 2246377 A1 | 11/2010 |
| EP | 2660797 A1 | 12/2011 |
| EP | 2660797 B1 | 12/2011 |
| EP | 2246377 B1 | 8/2014 |
| EP | 2856867 A | 4/2015 |
| EP | 3246172 A | 11/2017 |
| EP | 2739783 B1 | 3/2019 |
| EP | 3749520 A1 | 12/2020 |
| ES | 2046469 T3 | 2/1994 |
| ES | 2065744 T1 | 2/1995 |
| ES | 1220467 U | 11/2018 |
| ES | 5732852 T3 | 11/2018 |
| ES | 2815650 T3 | 3/2021 |
| FI | 924820 A | 4/1993 |
| FR | 2409009 A | 6/1979 |
| FR | 2770224 A1 | 4/1999 |
| FR | 2804285 A | 8/2001 |
| GB | 1011797 A1 | 12/1965 |
| GB | 2007965 A | 5/1979 |
| GB | 2538255 A | 11/2016 |
| GB | 2570705 A | 8/2019 |
| GB | 2538255 B | 2/2020 |
| HK | 1188866 A1 | 5/2014 |
| IL | 196086 A1 | 3/2013 |
| IN | 05790DN2013 A | 6/2013 |
| IN | 284535 B | 6/2017 |
| IN | 201717024407 A | 10/2017 |
| IN | 201811017844 A | 11/2019 |
| IN | 201727040452 A | 7/2020 |
| JP | 54073150 A | 11/1977 |
| JP | S5489058 A | 7/1979 |
| JP | S5498358 A | 8/1979 |
| JP | S6439938 A | 2/1989 |
| JP | 1133726 A | 5/1989 |
| JP | 1299024 A2 | 12/1989 |
| JP | 2131559 A2 | 5/1990 |
| JP | H02233381 A | 9/1990 |
| JP | 5316940 A | 12/1993 |
| JP | 5316941 A | 12/1993 |
| JP | H0662181 B2 | 8/1994 |
| JP | 2538487 A | 9/1996 |
| JP | 2553878 A | 11/1996 |
| JP | 2769747 B2 | 6/1998 |
| JP | 11042726 A1 | 2/1999 |
| JP | 2002220225 A | 8/2002 |
| JP | 2002262767 | 9/2002 |
| JP | 2002263482 A2 | 9/2002 |
| JP | 2006199950 A1 | 8/2006 |
| JP | 2007502219 A | 2/2007 |
| JP | 2008273172 A | 12/2007 |
| JP | 2010533802 T2 | 10/2010 |
| JP | 2009102035 A | 6/2011 |
| JP | 5830034 B | 12/2011 |
| JP | 5495799 B1 | 5/2014 |
| JP | 5495799 B2 | 5/2014 |
| JP | WO2012090498 A1 | 6/2014 |
| JP | 2016048380 A | 10/2015 |
| JP | 5840637 A | 1/2016 |
| JP | WO2013180013 A1 | 1/2016 |
| JP | 6185911 B1 | 8/2017 |
| JP | 2017527500 A | 9/2017 |
| JP | 2018508607 A | 3/2018 |
| JP | 2018518588 A | 7/2018 |
| JP | 2019177919 A1 | 10/2019 |
| JP | 2019528219 A | 10/2019 |
| KR | 189930008241 A | 5/1993 |
| KR | 100241804 B1 | 2/2000 |
| KR | 20030083719 A | 10/2003 |

(56) References Cited

FOREIGN PATENT DOCUMENTS

| | | | |
|---|---|---|---|
| KR | 20060073595 A | 6/2006 |
| KR | 100777083 B1 | 4/2007 |
| KR | 20090031591 A | 3/2009 |
| KR | 20100039407 A | 4/2010 |
| KR | 20110103817 A | 9/2011 |
| KR | 101707227 B | 12/2011 |
| KR | 20170048547 A | 5/2017 |
| KR | 20180005184 A | 1/2018 |
| KR | 20190009114 A | 1/2019 |
| KR | 20200139145 A | 12/2020 |
| MX | 2013007472 A1 | 8/2013 |
| MX | 2017014273 A | 6/2018 |
| MX | 2020010533 A | 12/2020 |
| NO | 180548 B | 1/1997 |
| NZ | 244867 A | 7/1995 |
| RU | 2104240 C1 | 2/1998 |
| RU | 2009102268 A | 8/2010 |
| RU | 2016104109 A | 12/2011 |
| RU | 2013128911 A | 2/2015 |
| RU | 2017143150 A | 6/2019 |
| SE | 438425 B | 4/1985 |
| SE | 469080 B | 5/1993 |
| SE | 1651029 A1 | 1/2018 |
| SE | 540667 C2 | 10/2018 |
| SG | 191372 A | 12/2011 |
| TW | 252080 B | 7/1995 |
| TW | 348076 B | 12/1998 |
| TW | 200916541 A | 4/2009 |
| TW | 201006899 A | 2/2010 |
| TW | I371478 B | 9/2012 |
| WO | 9011170 A | 10/1990 |
| WO | 9011171 A | 10/1990 |
| WO | 9011181 A | 10/1990 |
| WO | 9216681 A | 11/1992 |
| WO | 1998022215 A1 | 5/1998 |
| WO | 0130658 | 5/2001 |
| WO | 0154496 A1 | 8/2001 |
| WO | 0245847 A1 | 6/2002 |
| WO | 02071851 A1 | 9/2002 |
| WO | WO03039766 A1 | 5/2003 |
| WO | 05014283 A | 2/2005 |
| WO | 05026020 A | 3/2005 |
| WO | 05032694 A | 4/2005 |
| WO | WO-2005063309 A2 * | 7/2005 | ....... A61F 13/53747 |
| WO | 08000457 A1 | 1/2008 |
| WO | 2009012292 A1 | 1/2009 |
| WO | 09102035 A1 | 8/2009 |
| WO | 12090498 A1 | 12/2011 |
| WO | 12018870 A1 | 2/2012 |
| WO | 20130207 A1 | 2/2013 |
| WO | 13164646 A | 11/2013 |
| WO | 131780013 A | 12/2013 |
| WO | WO201514972 A1 | 2/2015 |
| WO | 18094543 A1 | 5/2015 |
| WO | 16037043 A1 | 3/2016 |
| WO | 16110711 A | 7/2016 |
| WO | 16181132 A | 11/2016 |
| WO | 17198674 A | 11/2017 |
| WO | 2018011666 A1 | 1/2018 |
| WO | 2018211440 A1 | 11/2018 |
| WO | 19149942 A1 | 8/2019 |
| WO | 19189337 A1 | 10/2019 |
| WO | 2019199491 A1 | 10/2019 |
| WO | 2019215763 A1 | 11/2019 |
| WO | 2022018621 A1 | 1/2022 |

* cited by examiner

METHOD FOR MAKING AIR PURIFYING PAPER GOODS

The current application claims a priority to the U.S. Provisional Patent application Ser. No. 63/076,543 filed on Sep. 10, 2020.

FIELD OF THE INVENTION

The present invention relates generally to air purifying paper goods. More specifically, the present invention relates to a method for integrating a quantity of natural or synthetic zeolite into a paperboard pulp mix during the production of paper goods.

BACKGROUND OF THE INVENTION

Most items at a supermarket, discount store, or shopping mall are delivered in boxes of corrugated cardboard. Other items may arrive in un-corrugated boxboard or paperboard boxes. Since corrugated cardboard is such a versatile packaging material, millions of tons are used each year to protect and display products.

Corrugated cardboard is a stiff, strong, and light-weight material made up of three layers of brown kraft paper. From a paper mill, rolls of kraft paper are transported to a corrugating, or converting, plant. At the plant, layers of kraft paper are crimped and glued to form corrugated cardboard, which is then cut, printed, folded, and glued to make boxes.

After the corrugator has heated, glued, and pressed the kraft paper to form corrugated cardboard, the continuous sheet of cardboard is cut into wide box blanks that then go to other machines for printing, cutting, and gluing. Finally, batches of finished boxes are banded together for shipping to the food processor, toy maker, automobile parts distributor, or any of the thousands of businesses that depend on corrugated cardboard packaging.

In actuality, cardboard boxes both corrugated and un-corrugated are used on an everyday basis, proportional to the continuing growth of delivery services, and online purchases. Thus, it is an objective of the present invention to incorporate natural or synthetic zeolite into the processing and manufacturing of cardboard in order to provide cardboard boxes with air purifying properties. The present invention successfully removes carbon dioxide in addition to Volatile Organic Compounds (VOCs) and other positively charged airborne pollutants.

SUMMARY OF THE INVENTION

Any variation, or slight modification of the present invention is to be considered within the scope of the invention.

The present invention generally relates to a zeolite infused air purifying cardboard, generalized cardboard and recycled cardboard. More specifically, to the integration of a quantity of natural or synthetic zeolite into a cardboard pulp mix during cardboard box production.

The integration of the quantity of natural or synthetic zeolite into the cardboard pulp mix results in a cardboard box with air purifying properties. Specifically, the method of the present invention produces cardboard and paper goods that remove carbon dioxide, VOCs and other positively charged airborne pollutants.

The present invention generates air purifying cardboard boxes that aid in reducing and removing the carbon footprint. The plurality of natural or synthetic zeolite is integrated into the cardboard pulp mix at any stage of a cardboard pulp mix production, but for the preferred embodiment it is added after a cleaning and refinement step of the cardboard pulp mix production. Further detail is described in the following sections of this document.

Additionally, the embodiments are merely examples and are not intended to limit the scope of the invention in any shape, way or form. Therefore, it is intended that the present invention covers all other embodiments that are within the scope of the appended claims and their equivalents.

DETAIL DESCRIPTIONS OF THE INVENTION

All illustrations of the drawings are for the purpose of describing selected versions of the present invention and are not intended to limit the scope of the present invention.

Referring to FIG. 1 through FIG. 5, the preferred embodiment of the present invention is a method for producing air purifying paper goods. The term "paper goods" is used herein to refer to objects including, but not limited to, boxes, cardboard, sheets of paper, disposable cups and plates, and various novelty items. The method of the present invention is designed to produce paper goods that absorb unwanted chemicals from the air. Specifically, the method of the present invention is used to produce paper goods that have been impregnated with an air purification compound to capture unwanted gaseous molecules and VOCs that are present in an environment. To achieve the above-described functionality, the method of the present invention makes use of a quantity of wood chips (Step A) and a quantity of at least one air purification compound (Step B). The quantity of air purification compound is preferably a zeolite compound. However, embodiments of the method of the present invention employ air purification compounds selected from the group comprising, activated carbon, photo electrochemical oxidation materials, and low-temperature oxidation catalysts. Preferably, the quantity of air purification compound absorbs at least one airborne compound selected from the group comprising carbon dioxide, formaldehyde, ethylene, and VOCs.

Figure 1:
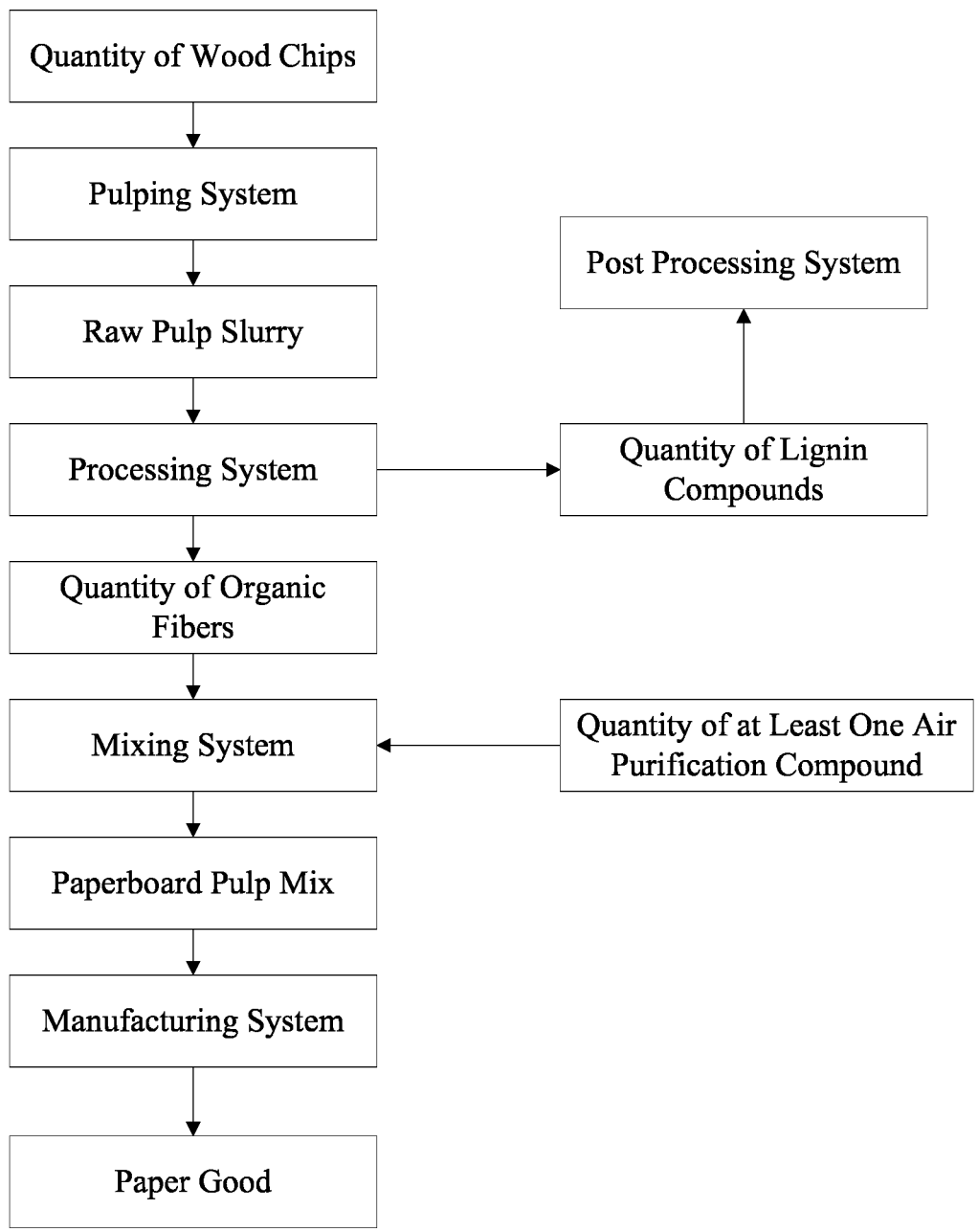
FIG. 1 is an input-output diagram illustrating the process for transitioning the quantity of wood chips into the paper good using the method of the present invention.
Figure 2:
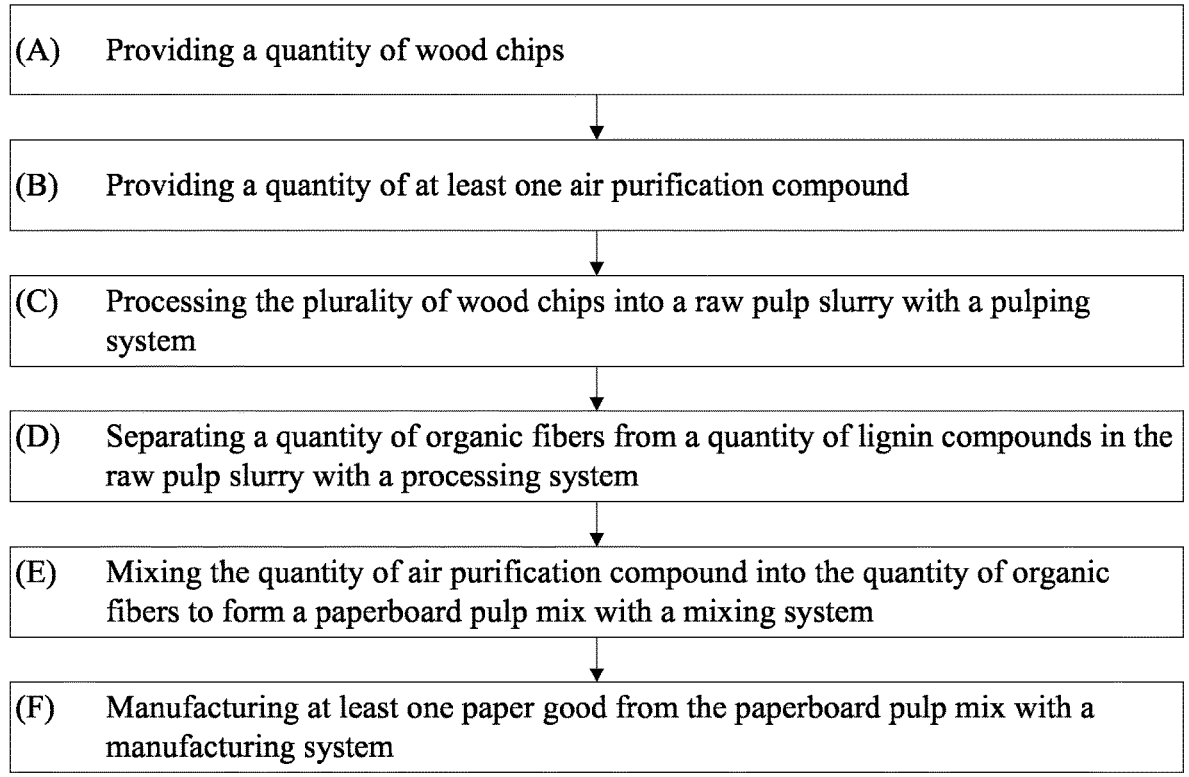
FIG. 2 is a flowchart illustrating the method of the present invention.

Referring to FIG. 1 and FIG. 2, the method of the present invention begins by processing the plurality of wood chips into a raw pulp slurry with a pulping system (Step C). The raw pulp slurry is a liquified form of processed wood material that comprises cellulose wood fibers and lignin compounds. The method of the present invention is designed to accommodate a wide variety of wood pulping techniques. Accordingly, the pulping system is at least one system selected from the group comprising, biodigesters and other chemical pulping systems, mechanical pulping systems, thermomechanical pulping systems, chemi-thermomechanical pulping systems, organosolv pulping systems, and biopulping systems. Further, the method of the present invention is designed to work with non-wood-based pulp materials including, but not limited to, recycled textiles, recycled paper goods, cotton, linen, hemp, abaca, and kozo.

Figure 4:
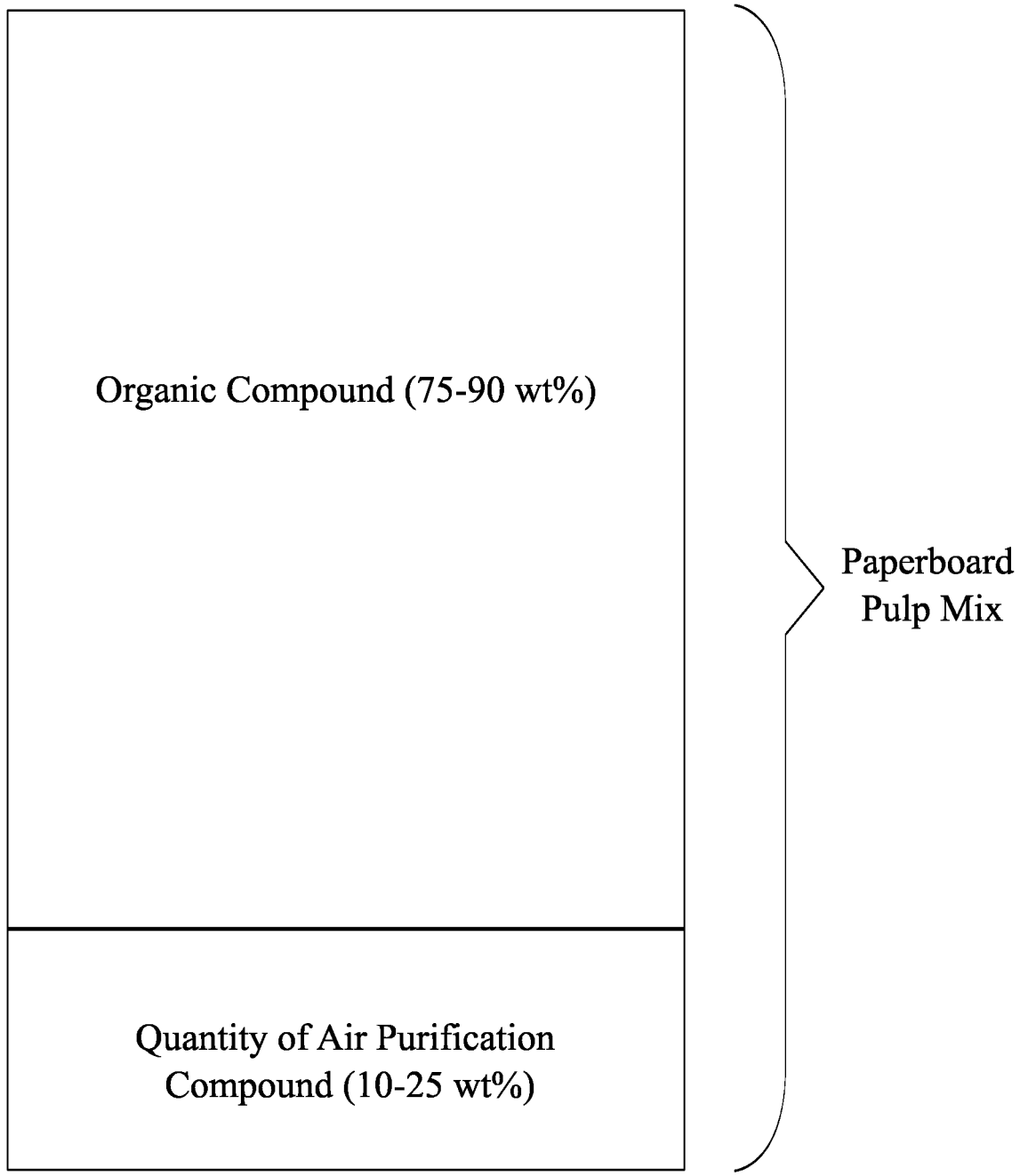
FIG. 4 is a block diagram illustrating the proportions of the paperboard pulp mix of the present invention.

Referring to FIG. 2 and FIG. 4, the method of the present invention continues by separating a quantity of organic fibers from a quantity of lignin compounds in the raw pulp slurry with a processing system (Step D). The processing system is a sieve or extractor device that drains the lignin-containing fluids in the raw pulp slurry out of the pulping system. Thus separated, the quantity of organic fibers is ready to be cleaned, bleached, or subjected to any number of secondary processing operations. The method of the present invention continues by mixing the quantity of air-purification compound into the quantity of organic fibers to form a paperboard pulp mix with a mixing system (Step E). The mixing system is an apparatus capable of impregnating the quantity of organic fibers with a desired quantity of air purification compound as well as any other additive required to manufacture a paper good with desired characteristics. Preferably, the quantity of air purification compound is a range of 10% by weight-25% by weight of the paperboard pulp mix. However, this concentration can be increased or decreased to produce paper goods with desired characteristics. In some embodiments, the quantity of organic fibers is subjected to at least one secondary processing operation while moving through the mixing system.

Referring to FIG. 1 and FIG. 2, the mixing system is capable of incorporating the quantity of air purification compound into the quantity of organic fibers at any point during the secondary processing operation required to transition the quantity of organic fibers into the paperboard pulp mix. The method of the present invention continues by manufacturing at least one paper good from the paperboard pulp mix with a manufacturing system. The paperboard pulp is a versatile material that can be used to produce a wide variety of paper goods. Accordingly, the manufacturing system is an apparatus used to extract any remaining fluids and form the paperboard pulp mix into a desired shape.

Figure 3:
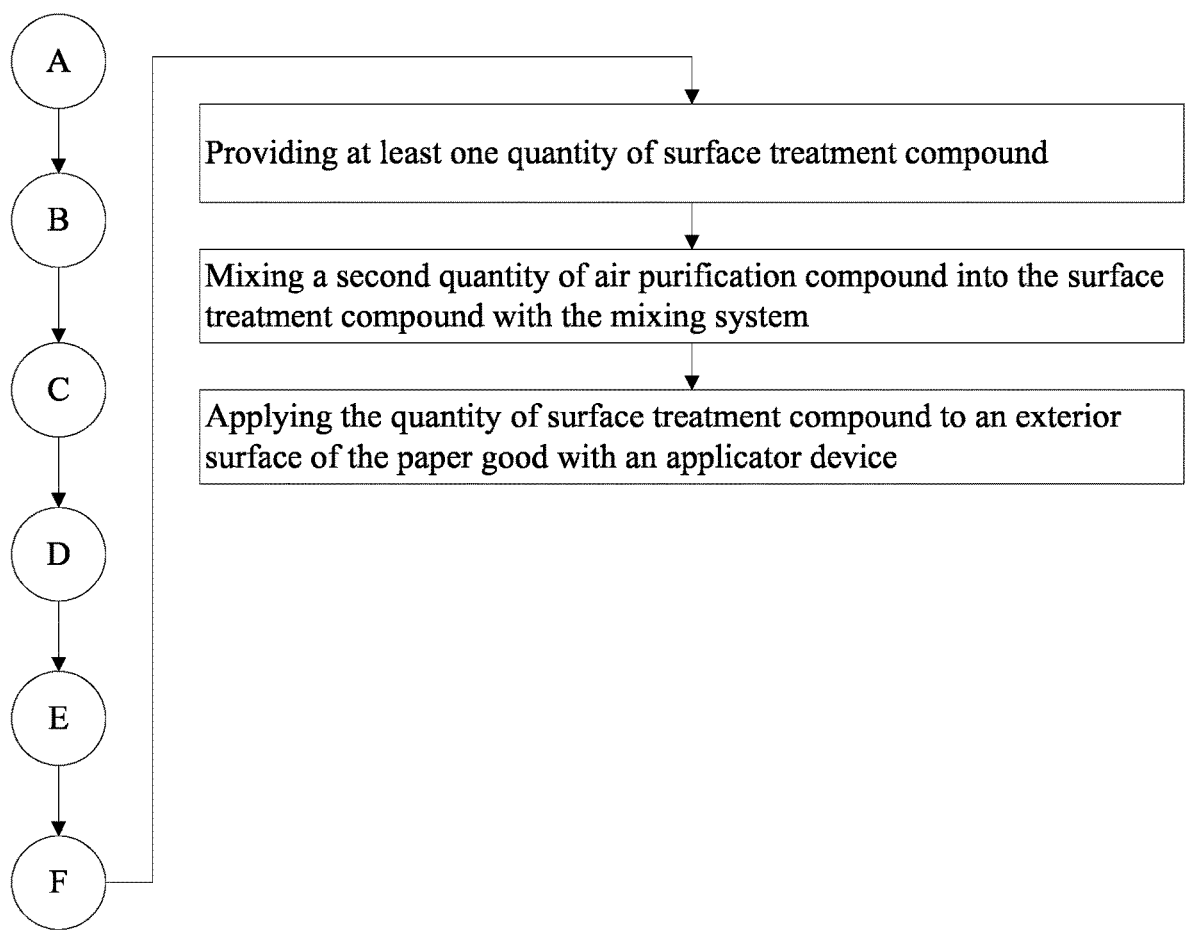
FIG. 3 is a flowchart illustrating the subprocess for applying a surface treatment compound to the paper good with the method of the present invention.
Figure 5:
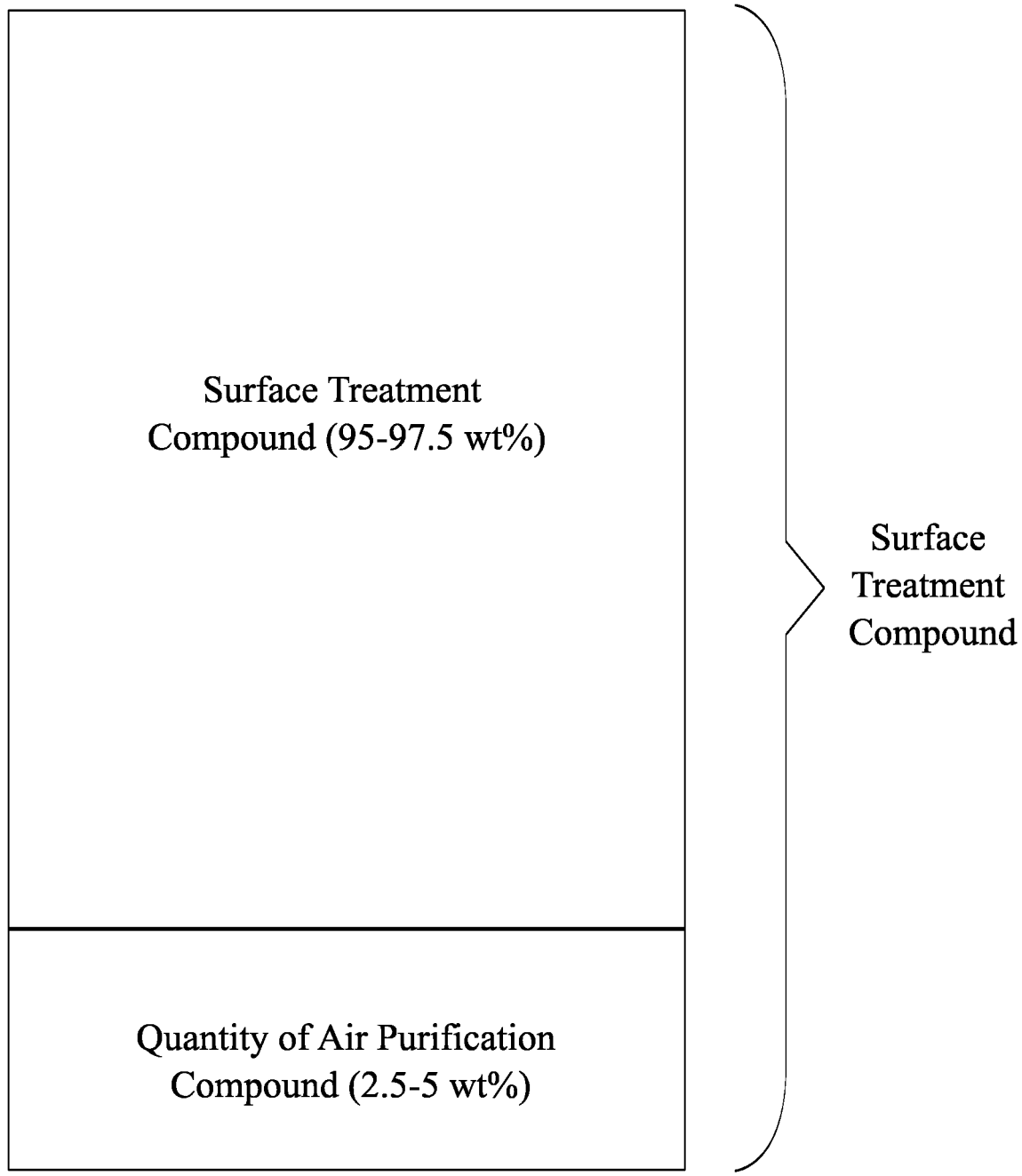
FIG. 5 is a block diagram illustrating the proportions of the surface treatment compound of the present invention.

Referring to FIG. 3 and FIG. 5, in some embodiments of the present invention a secondary exterior coating is employed to protect the paper good and absorb additional quantities of the unwanted gaseous molecules in the environment. To facilitate this functionality, the method of the present invention employs at least one quantity of surface treatment compound. The quantity of surface treatment compound is designed to be an additive that is superimposed onto the paper good. As such, the quantity of surface treatment compound is at least one compound selected from the group comprising, inks, pigments, clays, and laminates. The method of the present invention continues by mixing a second quantity of air purification compound into the surface treatment compound with the mixing system. Thus, the surface treatment compound is able to bolster the air purification capabilities of the paperboard mix. Preferably, the second quantity of air purification compound is a range of 2.5% by weight-5% by weight of the quantity of surface treatment compound. The method of the present invention continues by applying the quantity of surface treatment compound to an exterior surface of the paper good with an applicator device. The applicator device is at least one device selected from the group comprising sprayers, brushes, robotic end effectors, and rollers. In some embodiments, the quantity of surface treatment compound is an ink that is used to print logos and graphics onto the paper good.

Although the invention has been explained in relation to its preferred embodiment, it is to be understood that many other possible modifications and variations can be made without departing from the spirit and scope of the invention as hereinafter claimed.

What is claimed is:

1. A method for producing air purifying paper goods comprising:
   (A) providing a quantity of wood chips;
   (B) providing a first quantity of at least one air purification compound;
   (C) processing the quantity of wood chips into a raw pulp slurry with a pulping system;
   (D) separating a quantity of organic fibers from a quantity of lignin compounds in the raw pulp slurry with a processing system;
   (E) mixing the quantity of air-purification compound into the quantity of organic fibers to form a paperboard pulp mix with a mixing system;
   (F) manufacturing at least one paper good from the paperboard pulp mix with a manufacturing system
   (G) providing at least one quantity of surface treatment compound;
   (H) mixing a second quantity of air purification compound into the surface treatment compound with the mixing system, wherein the air purification compound is zeolite; and
   (I) applying the quantity of surface treatment compound to an exterior surface of the paper good with an applicator device.

2. The method for making air purifying paper goods as claimed in claim 1 comprising:
   the first quantity of air purification compound ranging between 10 wt. % and 25 wt. % of the paperboard pulp mix.

3. The method for making air purifying paper goods as claimed in claim 1 comprising:
   the second quantity of air purification compound ranging between 2.5 wt. % and 5 wt. % of the surface treatment compound.

4. The method for making air purifying paper goods as claimed in claim 1, wherein the air purification compound absorbs at least one airborne compound selected from the group comprising carbon dioxide, formaldehyde, ethylene, and volatile organic compounds (VOC).

* * * * *